(12) United States Patent
Rule et al.

(10) Patent No.: US 11,734,985 B2
(45) Date of Patent: Aug. 22, 2023

(54) CONTEXTUAL TAPPING ENGINE

(71) Applicant: Capital One Services, LLC, McLean, VA (US)

(72) Inventors: Jeffrey Rule, Chevy Chase, MD (US); Daniel Herrington, New York, NY (US); Colin Hart, Arlington, VA (US); Melissa Yoemans Heng, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/684,734

(22) Filed: Mar. 2, 2022

(65) Prior Publication Data

US 2022/0270429 A1    Aug. 25, 2022

Related U.S. Application Data

(63) Continuation of application No. 17/176,650, filed on Feb. 16, 2021, now Pat. No. 11,436,887, which is a continuation of application No. 16/826,439, filed on Mar. 23, 2020, now Pat. No. 10,957,143, which is a continuation of application No. 16/589,285, filed on
(Continued)

(51) Int. Cl.
| | | |
|---|---|---|
| *G07F 7/10* | (2006.01) | |
| *G07F 7/08* | (2006.01) | |
| *G06N 20/00* | (2019.01) | |
| *G06K 7/10* | (2006.01) | |

(52) U.S. Cl.
CPC ....... *G07F 7/1008* (2013.01); *G06K 7/10386* (2013.01); *G06N 20/00* (2019.01); *G07F 7/084* (2013.01); *G07F 7/0893* (2013.01)

(58) Field of Classification Search
CPC ........ G07F 7/1008; G07F 7/084; G07F 7/089; G07F 7/0893; G06K 7/10386; G06N 20/00
See application file for complete search history.

(56) References Cited

U.S. PATENT DOCUMENTS

| | | | | |
|---|---|---|---|---|
| 10,237,072 | B2 * | 3/2019 | Hoyer | ................. H04W 12/108 |
| 10,404,682 | B2 * | 9/2019 | Hoyer | .................. H04W 12/08 |

(Continued)

FOREIGN PATENT DOCUMENTS

KR        20150114358 A        10/2015

*Primary Examiner* — Sonji N Johnson
(74) *Attorney, Agent, or Firm* — KDW Firm PLLC

(57) ABSTRACT

Various embodiments for contextual tapping engines. For example, an application executing on a computing device may authenticate credentials associated with an account and detect a tap of a contactless card to the computing device. The application may receive, from a communications interface of the contactless card, action data used to determine an action associated with the tap of the contactless card to the computing device. The application may determine a context of the application based on a current output of the application. The application may determine, based on the action data, the determined context, and data associated with the account, a first action associated with the tap of the contactless card to the computing device, the first action associated with at least one of the application and an operating system (OS). The application may initiate performance of the first action based on the tap of the contactless card.

20 Claims, 10 Drawing Sheets

Related U.S. Application Data

Oct. 1, 2019, now Pat. No. 10,636,241, which is a continuation of application No. 16/359,987, filed on Mar. 20, 2019, now Pat. No. 10,643,420.

(56) References Cited

U.S. PATENT DOCUMENTS

| | | | |
|---|---|---|---|
| 2006/0010400 A1 | 1/2006 | Lin et al. | |
| 2014/0138435 A1* | 5/2014 | Khalid | G06Q 20/227 |
| | | | 235/380 |
| 2016/0364938 A1* | 12/2016 | Miranda | G06Q 20/3263 |
| 2017/0372180 A1* | 12/2017 | Li | G07F 7/0893 |
| 2018/0160255 A1* | 6/2018 | Park | H04L 67/02 |
| 2019/0011989 A1 | 1/2019 | Schwesig et al. | |
| 2019/0347888 A1* | 11/2019 | Agbeyo | G07D 7/0043 |
| 2021/0272098 A1* | 9/2021 | Delsuc | G06Q 20/341 |

* cited by examiner

CONTEXTUAL TAPPING ENGINE

RELATED APPLICATIONS

This application is a continuation application of U.S. patent application Ser. No. 17/176,650, filed on Feb. 16, 2021, which is a continuation of U.S. patent application Ser. No. 16/826,439, filed on Mar. 23, 2020, which is a continuation of U.S. patent application Ser. No. 16/589,285, filed on Oct. 1, 2019, which is a continuation of U.S. patent application Ser. No. 16/359,987, filed on Mar. 20, 2019. The contents of the aforementioned application are incorporated herein by reference in their entireties.

TECHNICAL FIELD

Embodiments herein generally relate to contactless cards, and more specifically, to contextual tapping engines for contactless cards.

BACKGROUND

Often, tapping a contactless card to a computing device may cause the computing device to perform a predefined action. However, the predefined action is static, and therefore may not be relevant given the intended action a user wishes to perform. Similarly, the predefined action may not be relevant given the context of the computing device.

SUMMARY

Embodiments disclosed herein provide systems, methods, articles of manufacture, and computer-readable media for a contextual tapping engine. According to one example, an application executing on a computing device may authenticate credentials associated with an account and detect a tap of a contactless card associated with the account to the computing device. The application may receive, from a communications interface of the contactless card, action data used at least in part to determine an action associated with the tap of the contactless card to the computing device. The application may determine a context of the application based at least in part on a current output of the application. The application may determine, based on the action data, the determined context, and data associated with the account, a first action associated with the tap of the contactless card to the computing device, the first action associated with at least one of the application and an operating system (OS) executing on the processor circuit. The application may initiate performance of the first action based on the tap of the contactless card to the computing device.

DETAILED DESCRIPTION

Figure 1:
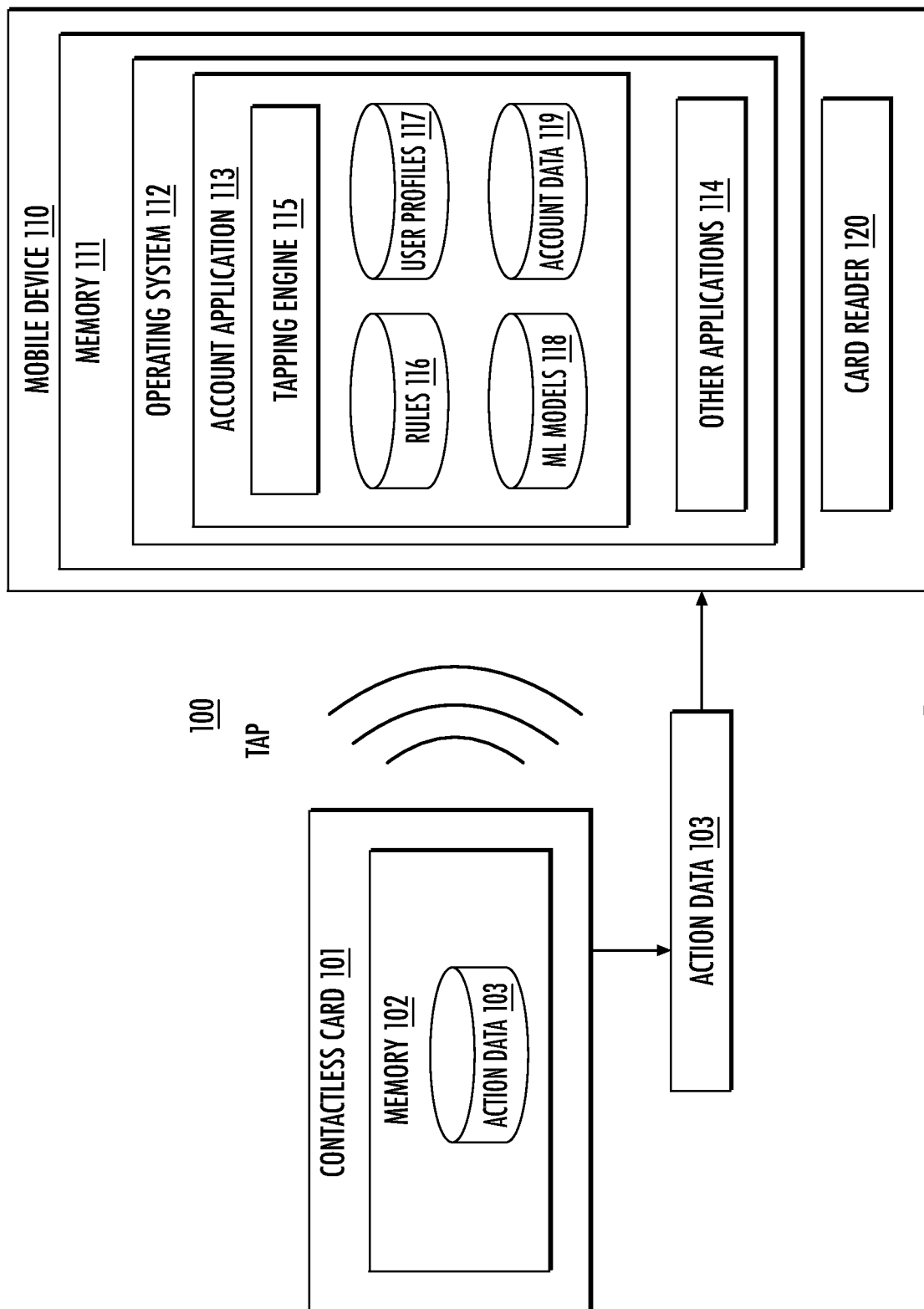
FIG. 1 illustrates an embodiment of a system to provide a contextual tapping engine.

Embodiments disclosed herein provide a contextual tapping engine which interprets a tap of a contactless card to a computing device to dynamically determine an action to perform on the computing device responsive to the tap. The contextual tapping engine may consider any number and type of factors when determining the action to perform. For example, the contextual tapping engine may consider one or more of a default action, a user-defined action, contextually determined actions, and/or predicted actions to determine an action to perform responsive to a given tap. The default action may be a default action specified in a memory of the contactless card. The user-defined action may be an action defined by the user and stored in the memory of the contactless card. The contextually determined actions may comprise actions that are dynamically generated by the computing device based at least in part on a current context of the computing device. The predicted actions may comprise actions generated by the computing device based at least in part historical data from a plurality of users. Doing so allows a diverse array of relevant actions to be performed responsive to a tap of a contactless card to a computing device.

For example, a user may receive a new contactless card and tap the contactless card to a smartphone. Responsive to the tap, the smartphone may open a card activation page of an account management application, which allows the user to active the card. The smartphone may open the card activation page based on a uniform resource locator (URL) specified as action data in the memory of the contactless card. Once the card is activated, the user may tap the card to the smartphone again. The smartphone may then determine, based on a context of the account management application, to open an account balance page of the account application. Responsive to another tap of the contactless card, the smartphone may leverage machine learning to predict an action associated with the tap. For example, the smartphone may predict to load a user-defined action page of the account management application. In the user-defined action page, the user may define an action (e.g., calling customer service), which may then be stored in the memory of the contactless card. The user-defined action may include one or more rules (or criteria) which, if met, cause the smartphone to perform the user-defined action (e.g., call customer service).

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to the desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system 100, consistent with disclosed embodiments. As shown, the system 100 includes one or more contactless cards 101 and one or more mobile devices 110. The contactless cards 101 are representative of any type of payment card, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication, or using NFC Data Exchange Format (NDEF) tags. Although NFC is used as an example communications protocol herein, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like.

As shown, a memory 102 of the contactless card includes a data store of action data 103. The action data 103 is representative of any type of data that can be interpreted by the tapping engine 115 of the account application 113 to perform an action on the mobile device 110. For example, the action data 103 may include a URL which is directed to a website, an application (e.g., the account application 113 and/or the other applications 114), an application page (e.g., of the account application 113 and/or the other applications 114 of the mobile device 110), a component of the OS 112, or other computing resource. When received by the tapping engine 115, the tapping engine 115 may cause the mobile device 110 to load the resource specified by the URL.

As another example, the action data 103 may include rules, conditions, and/or other data which allows the tapping engine 115 to determine an associated action. For example, the tapping engine 115 may determine a context of the mobile device 110, and determine a contextual action based on the context of the mobile device 110 and the action data 103. As another example, the tapping engine 115 may generate a predicted action that predicts the user's intent based on history data (e.g., prior actions performed by the user and/or other users). The tapping engine 115 may then initiate performance of the contextual action and/or the predicted action on the mobile device 110.

Furthermore, the action data 103 may store user-defined actions that can be interpreted by the tapping engine 115 to perform the user-defined action on the mobile device 110. The user-defined actions in the action data 103 may include URLs, as well as one or more rules or other conditions that must be satisfied before the tapping engine 115 performs the user-defined actions.

As shown, a memory 111 of the mobile device 110 includes an instance of an operating system (OS) 112. Example operating systems 112 include the Android® OS, iOS®, Linux®, and Windows® operating systems. As shown, the OS 112 includes an account application 113 and one or more other applications 114. The account application 113 allows users to perform various account-related operations, such as viewing account balances, purchasing items, and processing payments. Initially, a user may authenticate using authentication credentials to access certain features of the account application 113. For example, the authentication credentials may include a username and password, biometric credentials, and the like.

As shown, the account application 113 includes the tapping engine 115 and data stores of rules 116, user profiles 117, machine learning (ML) models 118, and account data 119. The tapping engine 115 is configured to determine an action associated with a tap of a contactless card 101 to a mobile device 110. As stated, the tapping engine 115 is configured to determine predefined actions associated with a tap, user-defined actions associated with a tap, generate contextual actions associated with a tap, and generate predicted actions associated with a tap. Generally, when the contactless card 101 is tapped to the mobile device 110 (e.g., brought into wireless communications range), the mobile device 110 may receive one or more records of action data 103 from a communications interface (e.g., NFC, Bluetooth, EMV, etc.) of the contactless card 101.

The tapping engine 115 may determine an action to perform on the mobile device 110 based at least in part on the action data 103. For example, the action data 103 may specify a URL. In some embodiments, the tapping engine 115 may further determine a context of the mobile device 110 when determining the action to perform on the mobile device 110. The tapping engine 115 may determine the context based on any attribute of the mobile device 110, such as which applications are executing on the mobile device 110, which application is in the foreground of a display of the mobile device 110, what functions are associated with the foreground application, analyzing data displayed on a display of the device, data in the user profiles 117, and/or data in the account data 119 (e.g., transaction data, purchase data, etc.).

Further still, in some embodiments, the tapping engine 115 may generate a predicted action which reflects the user's intent when determining the action to perform on the mobile device 110. For example, the user may repeatedly access an account statement page after tapping the contactless card 101 to the mobile device 110. In such an example, the tapping engine 115 may load the account statement page after detecting a tap of the contactless card 101 to the mobile device 110 by the user. As another example, the tapping engine 115 may leverage the ML models 118, which are trained based on training data. The training data may describe historical actions performed responsive to taps of contactless cards to devices by a plurality of different users. During training based on the training data, a machine learning (ML) algorithm may generate the ML models 118. The ML models 118 may be used to generate a predicted action for a given tap of a contactless card 101 to the mobile device 110. For example, the tapping engine 115 may provide one or more of the action data 103, the determined context, the rules 116, user profiles 117, and/or account data 119 to the ML models 118, which may generate one or more predicted actions. The ML models 118 may further compute a score for each predicted action, where the score reflects a likelihood that the action is the action intended by the user. The tapping engine 115 may then select the predicted action with the highest score, and initiate performance of the selected predicted action.

As stated, in some embodiments, the action data 103 specifies a default action (e.g., loading a card activation page of the account application 113 when a contactless card 101 that has not been activated for use is tapped to the mobile device 110). Therefore, in such an example, the tapping engine 115 loads the account activation page of the account application 113 responsive to the tap of the inactive card. As another example, the action data 103 may include a flag reflecting that the card has not been activated, and the tapping engine 115 loads the account activation page upon detecting the flag indicating that the card has not been activated. As yet another example, the tapping engine 115 may determine that the tapping engine 115 has not previously communicated with the card 101 to load the account activation page. In another example, a flag may be stored in a server maintained by the issuer of the contactless card 101. The flag stored in the server may indicate that the card has been sent to the customer but not yet activated. The tapping engine 115 may receive the flag from the server and load the account activation page in response. Once the card is activated, a different action may be stored as the action data 103. The different action may be generated by the contactless card 101 itself, the account application 113, and/or a user.

In other embodiments, the action data 103 specifies a user-defined action, such calling a customer service department at a phone number. The URL stored in the action data 103 may specify to open a phone application of the OS 112 (e.g., one of the other applications 114) and dial the phone number of the customer service department. In such an example, the tapping engine 115 opens the phone application and dials the phone number for the customer service department for the user responsive to receiving the action data 103 based on a tap of the contactless card 101.

As another example, the action data 103 is generic and interpreted by the tapping engine 115 (e.g., using context and/or prediction) to determine an associated action. For example, if the user taps the contactless card 101 to the mobile device 110 while viewing a home page of the account application 113, the tapping engine 115 may determine the context of the mobile device 110 is related to the associated account (e.g., based on the URL of the home page, determining concepts in the text outputted on the home page, etc.). In response, the tapping engine 115 may load an account balance page of the account application 113, which allows the user to view their account balance and other detailed account information. Therefore, the tapping engine 115 may monitor actions performed by the user, and store indications of the actions (along with any determined contexts) in the user profiles 117 and/or the account data 119. As another example, when the contactless card 101 is tapped to the mobile device 110, the tapping engine 115 may determine the account data 119 reflects that a purchase was made with the contactless card 101 (e.g., using a web browser of the other applications 114) within a predefined amount of time (e.g., 30 seconds, 1 minute, etc.). As such, the tapping engine 115 may perform actions related to the purchase. For example, the tapping engine 115 may programmatically schedule a payment for the purchase on the due date. As another example, the tapping engine 115 may load a rewards page allowing the customer to pay for the purchase using rewards points. As yet another example, the tapping engine 115 may determine an associated action based on the presence of one or more form fields in an application. For example, the tapping engine 115 may determine that a form field in a web browser currently includes an account number field. The tapping engine 115 may identify the account number field by any suitable means, such as reading metadata of the form field, reading the source code of the web page in the web browser, the document object model (DOM) of the web page, etc. Therefore, in such an example, the tapping engine 115 may output a notification specifying to tap the contactless card 101 to the device 110 to copy the account number of the card 101 to the account number field.

In some embodiments, once an action is performed responsive to a tap, the tapping engine 115 and/or the account application 113 may output a notification to the user indicating that the action has been performed. Additional notifications may specify to the user that any action can be linked to a card tap, including user-defined actions and/or one or more predefined actions that the user can select.

The rules 116 generally include one or more rules which may be used by the tapping engine 115 to determine an action responsive to a tap. For example, a rule in the rules 116 may specify to pay for movie tickets with rewards points if the user spends more than $10 on movie tickets within a specified amount of time. In such an example, the tapping engine 115 may detect a tap of the contactless card 101 and analyze the user's spending data in the account data 119 to determine that the user spent $20 on movie tickets within the specified amount of time. In response, the tapping engine 115 may programmatically generate a contextual action, which may include paying for the movie tickets with reward points, or loading a page of the account application 113 that allows the user to pay for the movie tickets with rewards points.

In some embodiments, the contactless card 101 may transmit multiple elements of action data 103 to the device 110. For example, an encrypted package may include multiple elements of action data 103 and delimiters and/or metadata used by the tapping engine 115 to parse the different elements of action data 103. In such an example, the single package may be decrypted, parsed, and used for one or more purposes (e.g., going to a URL, calling a phone number, and/or filling in a form field). For example, if multiple elements of action data 103 are separated by comma delimiters, the tapping engine 115 may parse each element based on the comma delimiters and perform one or more operations associated with each element of action data.

Figure 2A:
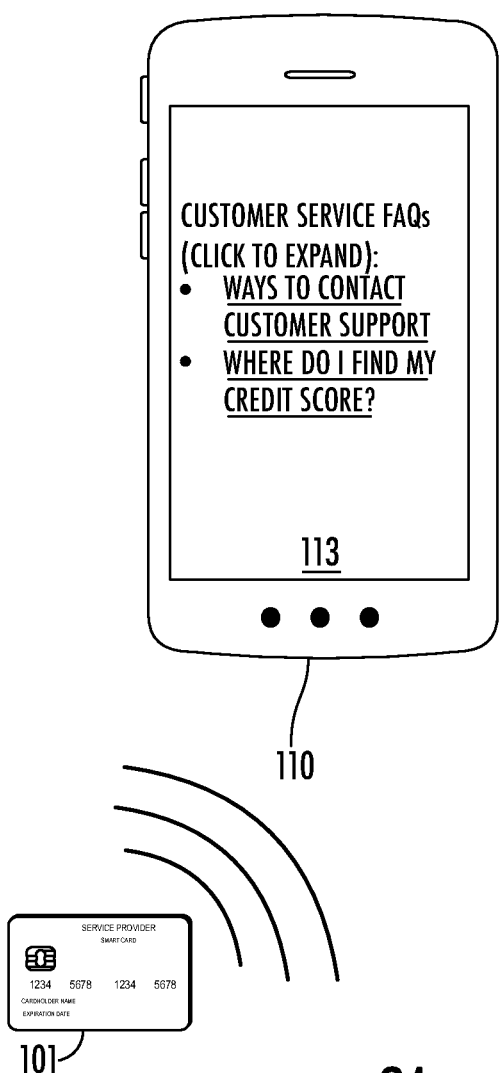
FIGS. 2A-2B illustrate embodiments of a contextual tapping engine.

FIG. 2A is a schematic 200 depicting an example of the tapping engine 115 determining an action responsive to a tap of the contactless card 101 to the mobile device 110, according to one embodiment. As shown, the account application 113 on the mobile device 110 is outputting a customer service page which includes frequently asked questions (FAQs) for customer service issues. When the contactless card 101 is tapped to the mobile device 110, the contactless card 101 may transmit action data 103 to the mobile device 110. However, the action data 103 may not specify what action to perform (e.g., access a URL for an application, page, etc.). Therefore, the tapping engine 115 may determine an action to perform responsive to the tap.

In at least one embodiment, the tapping engine 115 determines a context of the mobile device 110 to determine an action to perform. For example, the tapping engine 115 may determine that the customer service page of the account application 113 is currently displayed on the mobile device 110. For example, the tapping engine 115 may analyze the text of the customer service page, and detect concepts related to customer service. Therefore, the tapping engine 115 may determine that the context of the mobile device 110 is related to customer service. As such, the tapping engine 115 may determine to perform an action related to customer service, such as initiating a phone call to customer service, loading more detailed customer service pages in the account application 113, etc.

Additionally and/or alternatively, the tapping engine 115 may leverage the ML models 118 to determine an action associated with the tap of the contactless card 101 to the mobile device 110. For example, the tapping engine 115 may provide data to the ML models 118 describing the context of the mobile device 110 (e.g., that the customer service page is displayed, that the context is related to customer service, a history of applications and/or pages outputted for display on the mobile device 110, etc.). Furthermore, the ML models 118 may consider a history of tap actions performed by the associated user responsive and/or a history of tap actions performed by a plurality of users. For example, the history of tap actions may indicate that the most frequent action performed responsive to a tap of the contactless card 101 while the customer service FAQ page is displayed is dialing customer service. The ML models 118 may further consider the rules 116, user profiles 117, and/or the account data 119. The ML models 118 may then generate one or more candidate actions to perform and return the candidate action having the highest score as the action to perform responsive to the tap of the contactless card 101 to the mobile device 110.

Figure 2B:
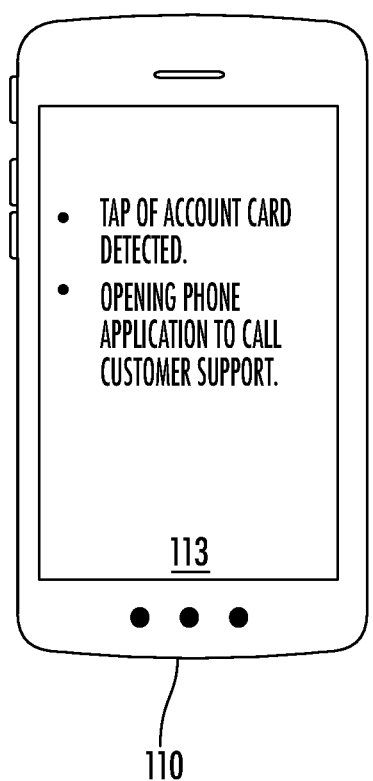

FIG. 2B is a schematic 210 depicting an embodiment where the tapping engine 115 determines to open a phone application to dial customer support on behalf of the user. As such, the tapping engine 115 may initiate the opening of a phone application of the OS 112, and cause the phone application to dial a phone number associated with customer support. For example, the tapping engine 115 may determine to dial customer support based on the determined context of the mobile device 110 in FIG. 2A. Additionally and/or alternatively, the ML models 118 may determine that calling customer support is the action most likely intended to be performed by the user (based on the computed score for each candidate action). Additionally and/or alternatively, the tapping engine 115 may determine to call customer support based on a rule specified in the rules 116 (and/or the user profiles 117), where the rule specifies to call customer service when customer service-related pages of the account application 113 are displayed.

Figure 3A:
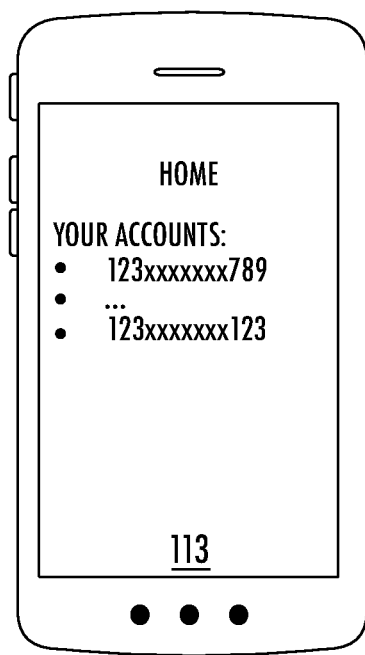
FIGS. 3A-3B illustrate embodiments of a contextual tapping engine.
Figure 3A:
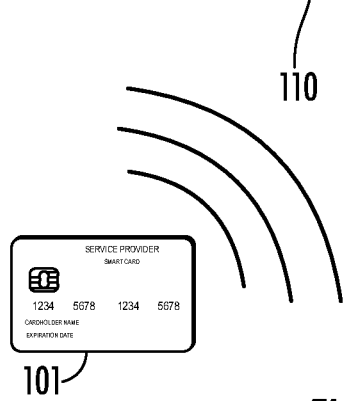

FIG. 3A is a schematic 300 depicting an example of the tapping engine 115 determining an action responsive to a tap of the contactless card 101 to the mobile device 110, according to one embodiment. As stated, when the contactless card 101 is tapped to the mobile device 110, the contactless card 101 may transmit action data 103 to the mobile device 110. However, the action data 103 may be generic and not specify an action to perform. Therefore, the tapping engine 115 may determine an action to perform responsive to the tap.

As shown, the account application 113 on the mobile device 110 is outputting a home page which includes an indication of one more accounts of the user. The tapping engine 115 may receive, from the account application 113, an indication that the home page is outputted for display. The tapping engine 115 may determine an action based on the context of the mobile device 110. As stated, the tapping engine 115 may determine the context by determining that the home page of the account application 113 is displayed. The tapping engine 115 may further determine the context by analyzing the output (e.g., any text and/or images) of the home page to determine concepts associated with the home page. Therefore, the tapping engine 115 may determine that the context of the mobile device 110 is related to the accounts of the user. Based on the determined context, the tapping engine 115 may determine to access a detailed account page of the account application 113.

Figure 3B:
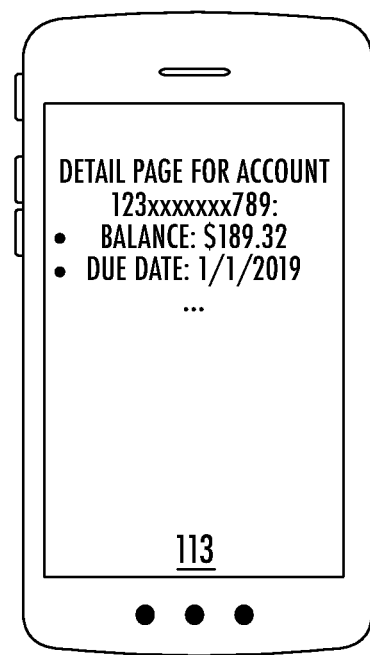

FIG. 3B is a schematic 310 illustrating an embodiment where the tapping engine 115 has caused the account application 113 to load a detailed page for the account associated with the contactless card 101 (e.g., based on an account number of the contactless card 101). As stated, the tapping engine 115 may determine to load the detailed page for the account responsive to the tap based on the context of the mobile device. Additionally and/or alternatively, the user may have specified a rule 116 indicating to load the account detail page when the contactless card 101 is tapped while the home page is displayed. Additionally and/or alternatively, the tapping engine 115 may predict, based on the ML models 118, that the user intends to load the account detail page responsive to the tap.

Figure 4:
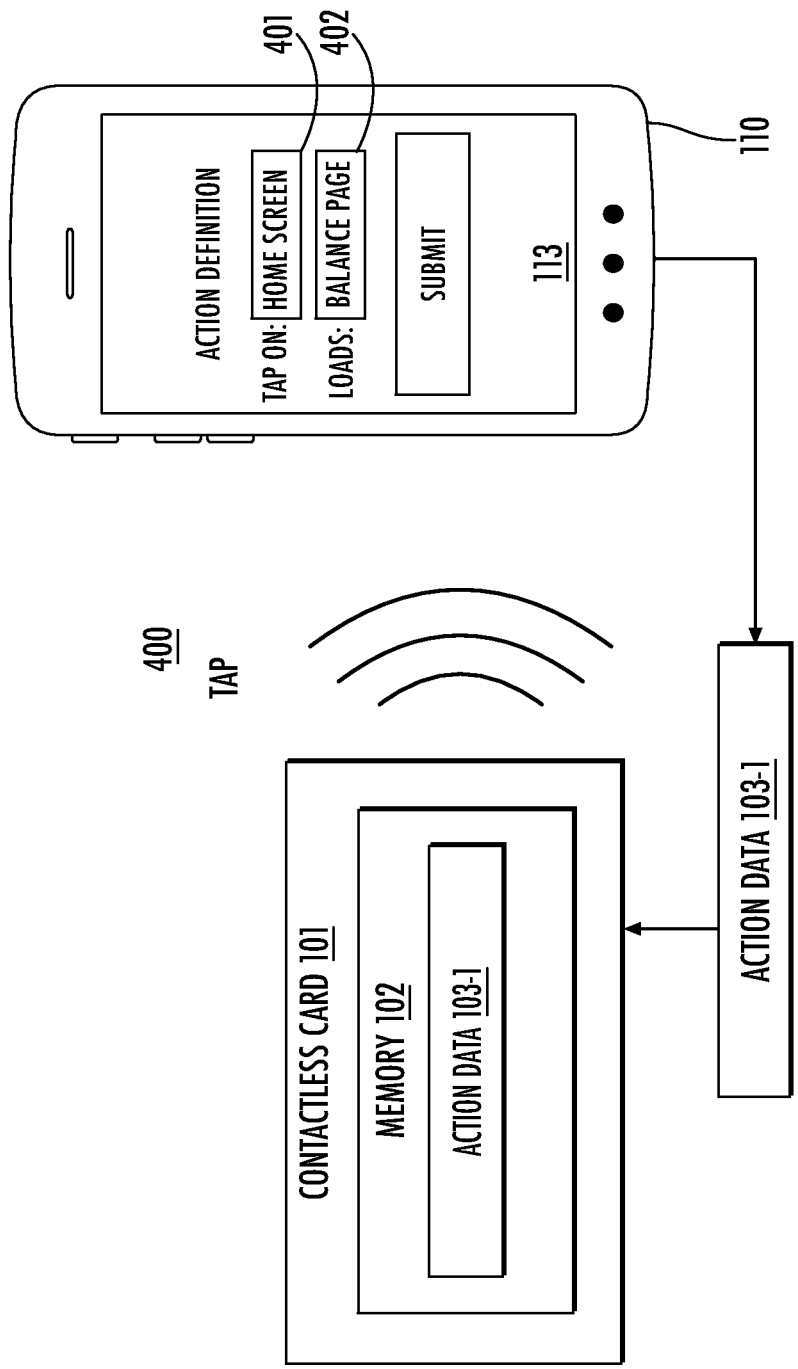
FIG. 4 illustrates an example of defining a rule for a contextual tapping engine.

FIG. 4 is a schematic 400 illustrating an example user-defined action for storage in the action data 103 of a contactless card 101, according to one embodiment. As shown, a graphical user interface of the account application 113 allows the user to define an action. For example, in GUI element 401, the user has specified that the action applies to a tap of the contactless card 101 while the account application 113 outputs a home page (e.g., the home page of FIG. 3A). Additionally, in GUI element 402, the user has specified that the tap of the contactless card 101 while the account application 113 outputs the home page should load a detailed balance page associated with the account (e.g., the account detail page of FIG. 3B). The input provided in GUI elements 401 may be manually entered by the user and/or selected by the user from a plurality of options (e.g., dropdown lists of options). When submitted, the account application 113 generates action data 103-1, which is transmitted to the contactless card 101. The contactless card 101 may then store the action data 103-1 as a record of action data 103 in the memory of the contactless card 101. In one embodiment, the action data 103-1 includes a URL that directs to the account detail page of the account application 113. However, in other embodiments, the action data 103-1 includes additional information (e.g., a rule specifying that the URL to the account detail page should be followed if the home page of the account application 113 is currently open on the mobile device 110).

Figure 5A:
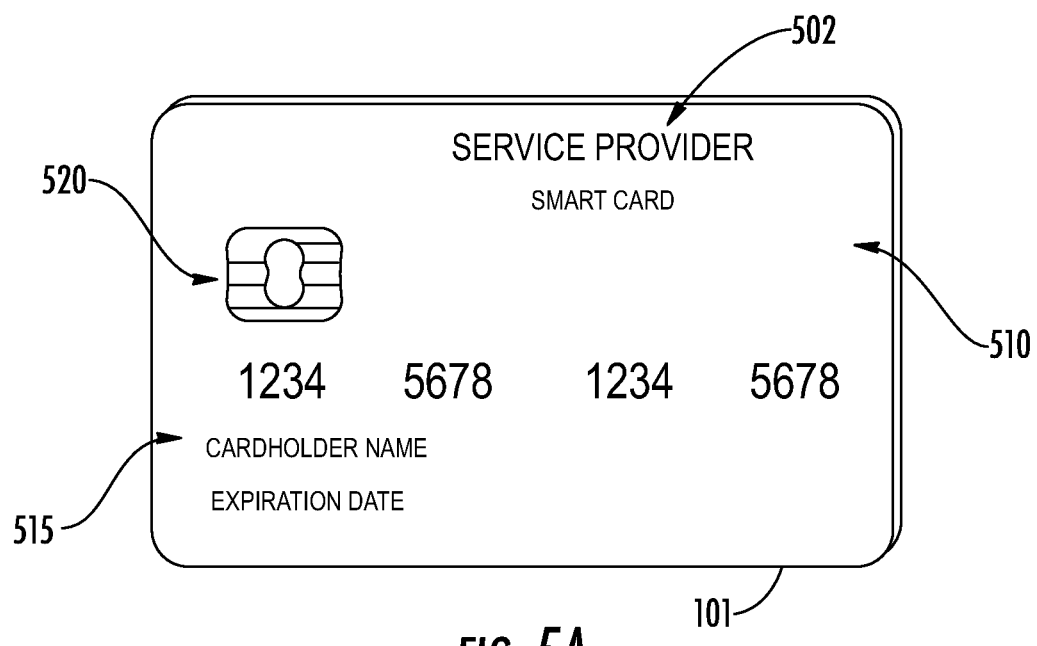
FIGS. 5A-5B illustrate an example contactless card.

FIG. 5A illustrates a contactless card 101, which may comprise a payment card, such as a credit card, debit card, and/or a gift card. As shown, the contactless card 101 may be issued by a service provider 502 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 510, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 515 displayed on the front and/or back of the card, and a contact pad 520. The contact pad 520 may be configured to establish contact with another communication device, such as the mobile devices 110, a user device, smart phone, laptop, desktop, or tablet computer. The contactless card 101 may also include processing circuitry, antenna and other components not shown in FIG. 5A. These components may be located behind the contact pad 520 or elsewhere on the substrate 510. The contactless card 101 may also include a magnetic strip or tape, which may be located on the back of the card (not shown in FIG. 5A).

Figure 5B:
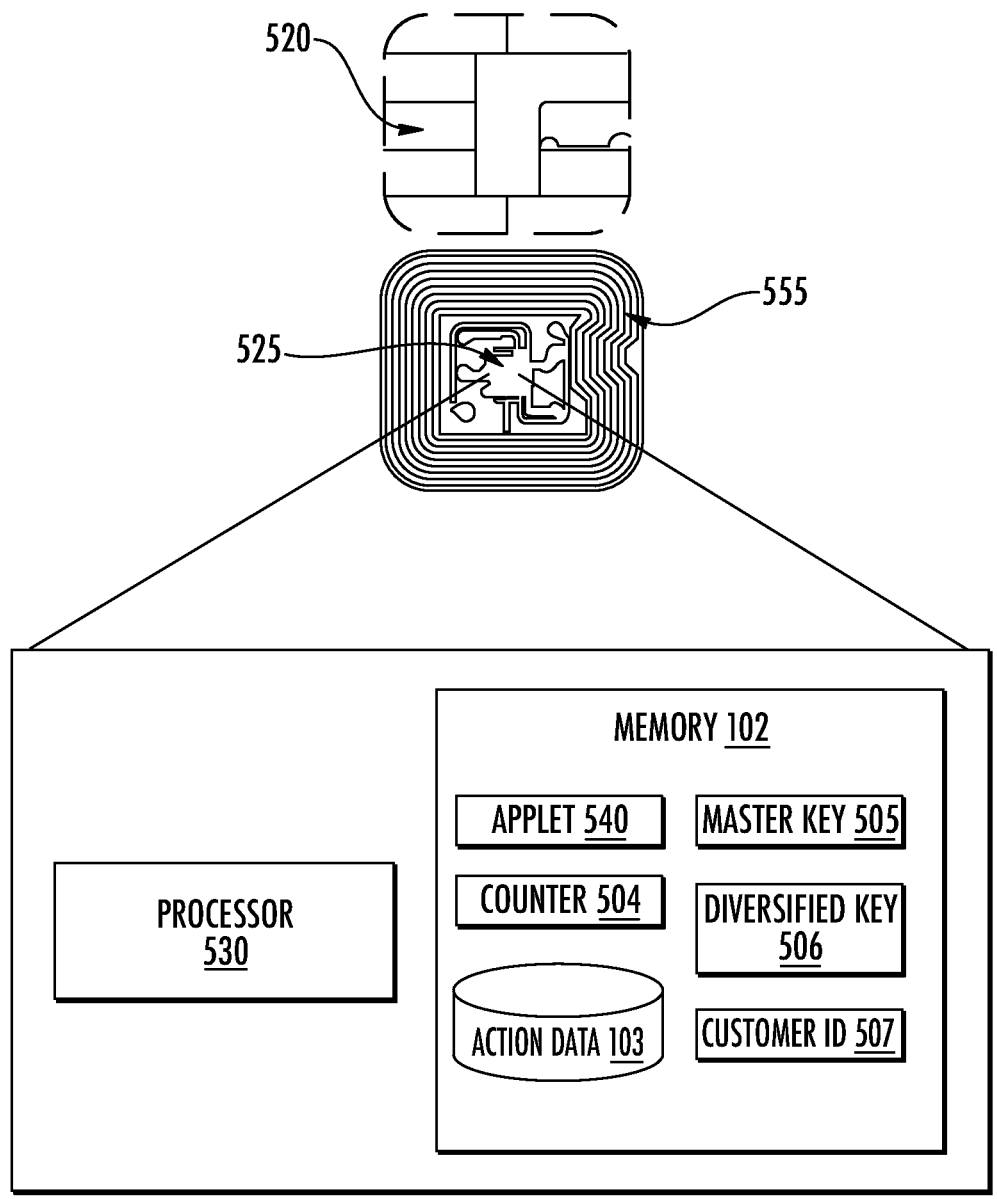

As illustrated in FIG. 5B, the contact pad 520 of contactless card 101 may include processing circuitry 525 for storing and processing information, including a microprocessor 530 and the memory 102. It is understood that the processing circuitry 525 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store the action data 103, one or more applets 540, one or more counters 504, and one or more customer identifiers 507. The one or more applets 540 may comprise one or more software applications configured to execute on one or more contactless cards, such as a Java® Card applet. However, it is understood that applets 540 are not limited to Java Card applets, and instead may be any software application operable on contactless cards or other devices having limited memory. The one or more counters 504 may comprise a numeric counter sufficient to store an integer. The customer identifier 507 may comprise a unique alphanumeric identifier assigned to a user of the contactless card 101, and the identifier may distinguish the user of the contactless card from other contactless card users. In some examples, the customer identifier 507 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 520 or entirely separate from it, or as further elements in addition to processor 530 and memory 102 elements located within the contact pad 520.

In some examples, the contactless card 101 may comprise one or more antennas 555. The one or more antennas 555 may be placed within the contactless card 101 and around the processing circuitry 525 of the contact pad 520. For example, the one or more antennas 555 may be integral with the processing circuitry 525 and the one or more antennas 555 may be used with an external booster coil. As another example, the one or more antennas 555 may be external to the contact pad 520 and the processing circuitry 525.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 555, processing circuitry 525, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

One example of an NDEF OTP is an NDEF short-record layout (SR=1). In such an example, one or more applets 540 may be configured to encode the OTP as an NDEF type 4 well known type text tag. In some examples, NDEF messages may comprise one or more records. The applets 540 may be configured to add one or more static tag records in addition to the OTP record.

In some examples, the contactless card 101 and server 120 may include certain data such that the card may be properly identified. The contactless card 101 may comprise one or more unique identifiers (not pictured). Each time a read operation takes place, the counters 104 may be configured to increment. In some examples, each time data from the contactless card 101 is read (e.g., by a mobile device 110), the counter 104 is transmitted to the server for validation and determines whether the counter values 104 are equal (as part of the validation).

In some examples, the one or more applets 540 may be configured to maintain its personalization state to allow personalization only if unlocked and authenticated. Other states may comprise standard states pre-personalization. On entering into a terminated state, the one or more applets 540 may be configured to remove personalization data. In the terminated state, the one or more applets 540 may be configured to stop responding to all application protocol data unit (APDU) requests.

The one or more applets 540 may be configured to maintain an applet version (2 bytes), which may be used in the authentication message. In some examples, this may be interpreted as most significant byte major version, least significant byte minor version. The rules for each of the versions are configured to interpret the authentication message: For example, regarding the major version, this may include that each major version comprise a specific authentication message layout and specific algorithms. For the minor version, this may include no changes to the authentication message or cryptographic algorithms, and changes to static tag content, in addition to bug fixes, security hardening, etc.

In some examples, the one or more applets 540 may be configured to emulate an RFID tag. The RFID tag may include one or more polymorphic tags. In some examples, each time the tag is read, different cryptographic data is presented that may indicate the authenticity of the contactless card. Based on the one or more applications, an NFC read of the tag may be processed, the data may be transmitted to a server, and the data may be validated at the server.

In some examples, the contactless card 101 and server may include certain data such that the card may be properly identified. The contactless card 101 may comprise one or more unique identifiers (not pictured). Each time a read operation takes place, the counters 504 may be configured to increment. In some examples, each time data from the contactless card 101 is read (e.g., by a mobile device 110), the counter 504 is transmitted to the server for validation and determines whether the counter values 504 are equal (as part of the validation).

The one or more counters 504 may be configured to prevent a replay attack. For example, if a cryptogram has been obtained and replayed, that cryptogram is immediately rejected if the counter 504 has been read or used or otherwise passed over. If the counter 504 has not been used, it may be replayed. In some examples, the counter that is incremented on the card is different from the counter that is incremented for transactions. The contactless card 101 is unable to determine the application transaction counter 504 is since there is no communication between applets 540 on the contactless card 101. In some examples, the contactless card 101 may comprise a first applet 540-1, which may be a transaction applet, and a second applet 540-2. Each applet may comprise a counter 504.

In some examples, the counter 504 may get out of sync. In some examples, to account for accidental reads that initiate transactions, such as reading at an angle, the counter 504 may increment but the application does not process the counter 504. In some examples, when the mobile device 110 is woken up, NFC may be enabled and the mobile device 110 may be configured to read available tags, but no action is taken responsive to the reads.

To keep the counter 504 in sync, an application, such as a background application, may be executed that would be configured to detect when the mobile device 110 wakes up and synchronize with the server 120 indicating that a read that occurred due to detection to then move the counter 504 forward. In other examples, Hashed One Time Password may be utilized such that a window of mis-synchronization may be accepted. For example, if within a threshold of 10, the counter 504 may be configured to move forward. But if within a different threshold number, for example within 10 or 1000, a request for performing re-synchronization may be processed which requests via one or more applications that the user tap, gesture, or otherwise indicate one or more times via the user's device. If the counter 504 increases in the appropriate sequence, then it possible to know that the user has done so.

The contactless card 101 is configured to perform a key diversification technique using the counter 504, master key 505, and diversified key 506 to secure data (e.g., when transmitting the action data 103 to the mobile device 110). Generally, a server (or another computing device owned and/or operated by an issuer of the contactless card 101) and the contactless card 101 may be provisioned with the same master key 505 (also referred to as a master symmetric key). More specifically, each contactless card 101 is programmed with a distinct master key 505 that has a corresponding pair in the server. For example, when a contactless card 101 is manufactured, a unique master key 505 may be programmed into the memory 102 of the contactless card 101. Similarly, the unique master key 505 may be stored in a record of a customer associated with the contactless card 101 in the account data 119 of the server (or stored in a different secure location). The master key may be kept secret from all parties other than the contactless card 101 and server.

The master keys 505 may be used in conjunction with the counters 504 to enhance security using key diversification. The counters 504 comprise values that are synchronized between the contactless card 101 and server. The counter value 504 may comprise a number that changes each time data is exchanged between the contactless card 101 and the server (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 120 of the mobile device 110. Card reader 120 may be configured to read from and/or communicate with contactless card 101 (e.g., via NFC, Bluetooth, RFID, etc.). Therefore, example card readers 120 include NFC communication modules, Bluetooth communication modules, and/or RFID communication modules.

For example, a user may tap the contactless card 101 to the mobile device 110, thereby bringing the contactless card 101 sufficiently close to the card reader 120 of the mobile device 110 to enable NFC data transfer between the contactless card 101 and the card reader 120 of the mobile device 110. After communication has been established between mobile device 110 and contactless card 101, the contactless card 101 generates a message authentication code (MAC) cryptogram. In some examples, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 120, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, the counter value 504 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In some examples, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server for verification as explained below. However, in some embodiments, the mobile device 110 may verify the MAC cryptogram.

More generally, when preparing to send data (e.g., to the server and/or the mobile device 110), the contactless card 101 may increment the counter value 504. The contactless card 101 may then provide the master key 505 and counter value 504 as input to a cryptographic algorithm, which produces a diversified key 506 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 507 and any other data) using the diversified key 506. The contactless card 101 may then transmit the encrypted data to the account application 113 of the mobile device 110 (e.g., via an NFC connection, Bluetooth connection, etc.). The account application 113 of the mobile device 110 may then transmit the encrypted data to the server via a network (e.g., the Internet). In at least one embodiment, the contactless card 101 transmits the counter value 504 with the encrypted data. In such embodiments, the contactless card 101 may transmit an encrypted counter value 504, or an unencrypted counter value 504.

Upon receiving the encrypted customer ID 507, the server may perform the same symmetric encryption using the counter value 504 as input to the encryption, and the master key 505 as the key for the encryption. As stated, the counter value 504 may be specified in the data received from the mobile device 110, or a counter value 504 maintained by the server to implement key diversification for the contactless card 101. The output of the encryption may be the same diversified key value 506 that was created by the contactless card 101. The server may then decrypt the encrypted customer ID 507 received via the network using the diversified key 506, which reveals the data transmitted by the contactless card 101 (e.g., at least the customer identifier 507). Doing so allows the server to verify the data transmitted by the contactless card 101 via the mobile device 110, e.g., by comparing the decrypted customer ID 507 to a customer ID in the account data for the account.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 6:
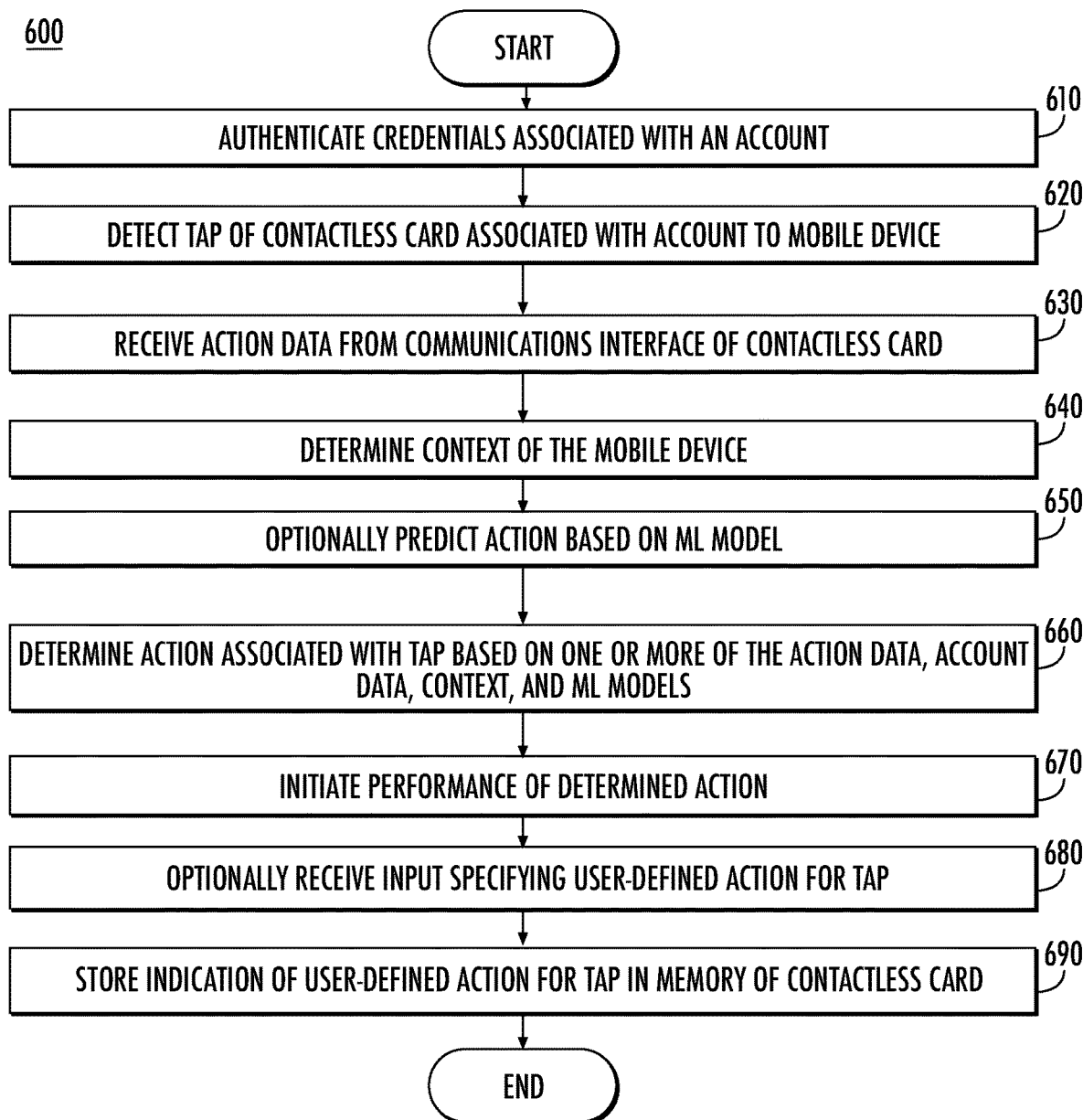
FIG. 6 illustrates an embodiment of a first logic flow.

FIG. 6 illustrates an embodiment of a logic flow 600. The logic flow 600 may be representative of some or all of the operations executed by one or more embodiments described herein. For example, the logic flow 600 may include some or all of the operations to determine actions to perform based on a tap of a contactless card 101 to a computing device. Embodiments are not limited in this context.

As shown, the logic flow 600 begins at block 610, where the account application 113 executing on a mobile device 110 authenticates credentials associated with an account. For example, a user attempting to access the account application 113 may provide fingerprints, a login/password combination, or other credentials to access their account(s) in the account application 113. In some embodiments, the account application 113 may receive transaction data associated with the account (e.g., from a server that processes transactions for the account). At block 620, the account application 113 and/or the tapping engine 115 may detect a tap of the contactless card 101 to the mobile device 110. For example, the contactless card 101 and the mobile device 110 may come within NFC communications range at block 620. At block 630, the account application 113 receives action data 103 of the contactless card 101 via a communications interface of the contactless card 101. The account application 113 may then provide the action data 103 to the tapping engine 115. In one embodiment, the contactless card 101 encrypts the action data 103 using one or more key diversification techniques (e.g., using the counter 504, master key 505, and diversified key 506). The account application 113 may then validate the encrypted action data 103, and/or forward the encrypted action data 103 to a server for validation.

At block 640, the tapping engine 115 determines a context of the mobile device 110. The context may include a context of the OS 112, the account application 113, and/or the other applications 114. For example, the context may include determining what application (and/or component of the OS1 112) is outputted for display on the mobile device 110, and what functions and/or actions are associated with the application outputted for display. At block 650, the tapping engine 115 may optionally generate one or more predicted actions based on one or more ML models 118. As stated, the ML models 118 may be trained based on training data, where the training data includes historical tapping data for the current user and/or a plurality of other users. Doing so allows the ML models 118 to accurately predict one or more intended actions associated with the tap of the contactless card 101 to the mobile device 110 at block 620.

At block 660, the tapping engine 115 determines an action associated with the tap of the contactless card 101 to the mobile device 110 at block 620. Generally, the tapping engine 115 may determine the action based on one or more of the action data 103, the account data 119 of the authenticated account, the determined context, the rules 116, and/or the user profiles 117. For example, as stated, in some embodiments, the action data 103 specifies the action (e.g., loading content at a specified URL using the account application 113 and/or the other applications 114). As another example, the tapping engine 115 may determine that the context of the mobile device 110 is related to activating an inactive contactless card 101 and load a page of the account application 113 that allows the user to activate the contactless card 101. As yet another example, the ML models 118 may generate one or more candidate actions and associated scores. The tapping engine 115 may select the candidate action having the highest score.

At block 670, the OS 112, the account application 113, and/or the tapping engine 115 initiates performance of the action determined at block 660. For example, a phone application of the OS 112 may be opened and a phone number may be dialed for the user. As another example, a page of the account application 113 may be opened. As yet another example, a web page may be loaded by a web browser. At block 680, the account application 113 may optionally receive input specifying a user-defined action for a tap of the contactless card 101. At block 690, the user-defined action may be stored as action data 103 in a memory of the contactless card 101. Doing so allows the user-defined action to be performed response to a subsequent tap of the contactless card 101 to the mobile device 110.

Figure 7:
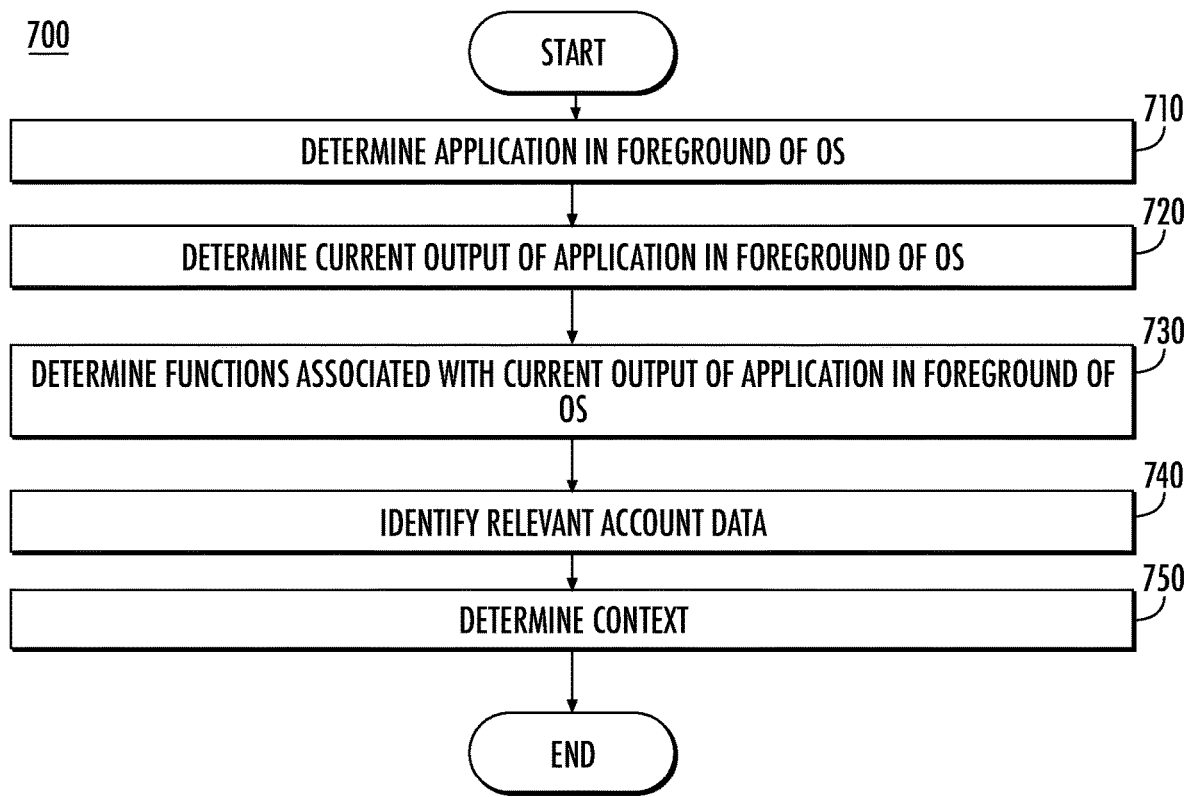
FIG. 7 illustrates an embodiment of a second logic flow.

FIG. 7 illustrates an embodiment of a logic flow 700. The logic flow 700 may be representative of some or all of the operations executed by one or more embodiments described herein. For example, the logic flow 700 may include some or all of the operations to determine a context of a computing device. Embodiments are not limited in this context.

As shown, the logic flow 700 begins at block 710, where the tapping engine 115 determines one or more applications that are in the foreground of the OS 112. Stated differently, the tapping engine 115 determines one or more applications that are visible on a display of the mobile device 110. At block 720, the tapping engine 115 determines a current output of the one or more applications determined at block 710. For example, the tapping engine 115 may determine which page is outputted in a web browser based on a URL of the page. As another example, the tapping engine 115 may analyze text outputted by the application. As another example, the tapping engine 115 may determine which page of the account application 113 is currently outputted for display.

At block 730, the tapping engine 115 determines one or more functions associated with the one or more applications determined at block 710. For example, the tapping engine 115 may determine, based on the URL of the web browser, that the web page is associated with transferring funds from one account to another account. As another example, the tapping engine 115 may determine a function associated with the page of the account application 113 being outputted. As yet another example, the tapping engine 115 may determine concepts in the text outputted by the application, and determine the functions based on the concepts.

At block 740, the tapping engine 115 optionally determines any relevant account data 119. For example, the account data 119 may reflect purchases, transactions, card activations, or other account-related operations. The tapping engine 115 may consider the account data 119 when determining the context (e.g., if the user recently completed a purchase with the contactless card 101, the context may include the purchase). At block 750, the tapping engine 115 determines the context of the mobile device 110 based on one or more of the determinations made at blocks 710-740. Doing so allows the tapping engine 115 to determine an action to perform responsive to a tap of the contactless card 101 to the mobile device 110.

Figure 8:
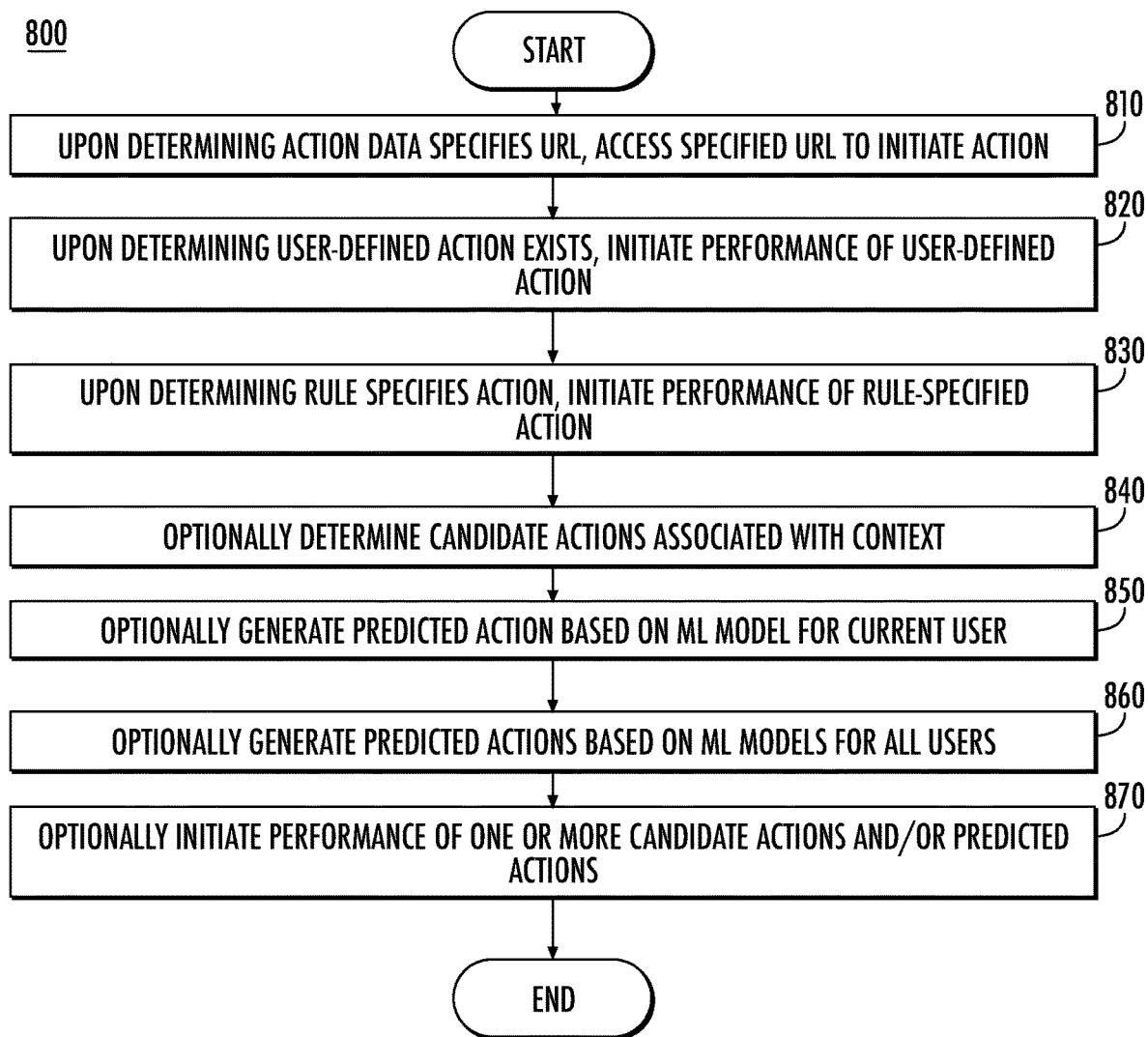
FIG. 8 illustrates an embodiment of a third logic flow.

FIG. 8 illustrates an embodiment of a logic flow 800. The logic flow 800 may be representative of some or all of the operations executed by one or more embodiments described herein. For example, the logic flow 800 may include some or all of the operations to perform an action responsive to a tap of a contactless card 101 to a computing device. Embodiments are not limited in this context.

As shown, the logic flow 800 begins at block 810, where the tapping engine 115 determines that the action data 103 received from the contactless card 101 (e.g., at block 630 of FIG. 6) specifies a URL. In response, the tapping engine 115 causes the URL to be accessed to initiate performance of the action specified by the URL. For example, if the URL is for a telephone number, the tapping engine 115 may cause the OS 112 to open a phone application and dial the telephone number. As another example, if the URL is to a website, the tapping engine 115 may cause the OS 112 to launch a web browser and load the URL.

At block 820, the tapping engine 115 may determine that a user-defined action is specified (e.g., in the user profiles 117). The tapping engine 115 may then initiate performance of the user-defined action. For example, a user-defined action in the user profiles 117 may specify to load the home page of the account application 113 as a default action. Therefore, the tapping engine 115 may load the home page in response to a tap of the contactless card 101 to the mobile device 110. At block 830, the tapping engine 115 initiates performance of an action specified by the rules 116. For example, a default rule 116 may specify to load an account detail page of the account application 113 if no action is specified by the action data 103 and/or if no user-defined action is specified.

At block 840, the tapping engine 115 may optionally determine one or more candidate actions based on a context of the mobile device 110. For example, the tapping engine 115 may reference mappings between candidate actions and applications, functions, and/or contexts. The tapping engine 115 may then select one or more of the candidate actions to perform responsive to a tap of the contactless card 101 to the mobile device 110. At block 850, the tapping engine 115 generates one or more predicted actions based on an ML model 118 that has been trained based on training data associated with the current user. Doing so considers the actions of the current user when generating candidate actions. A At block 860, the tapping engine 115 generates one or more predicted actions based on ML model(s) 118 that have been trained based on training data associated with a plurality of users, which may include the current user. Doing so considers the actions of all users when generating candidate actions. At block 870, the tapping engine 115 optionally initiates performance of one or more of the candidate actions determined at block 840 and/or the predicted actions generated at blocks 850 and/or 860.

In some examples, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may be configured to process one or more tap gestures. As explained above, the one or more applications may be configured to validate identity of the user and then cause the user to act or respond to it, for example, via one or more tap gestures. In some examples, data for example, bonus points, loyalty points, reward points, healthcare information, etc., may be written back to the contactless card.

In some examples, the contactless card 101 may be tapped to a device, such as the mobile device 110. As explained above, identity of the user may be verified by the one or more applications which would then grant the user a desired benefit based on verification of the identity.

In some embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in some embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In some examples, the contactless card 101 can selectively communicate information depending upon the recipient device. Once tapped, the contactless card 101 can recognize the device to which the tap is directed, and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In some examples, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In some examples the POS device can be affiliated with an authorized merchant or other entity familiar with certain contactless cards or accustomed to performing certain contactless card transactions. However, it is understood such an affiliation is not required for the performance of the described methods.

In some examples, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In some examples, the one or more applications may be configured to determine that it was launched via one or more tap gestures of the contactless card 101, such that a launch occurred at 3:51 pm, that a transaction was processed or took place at 3:56 pm, to verify identity of the user.

In some examples, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the contactless card.

In some examples, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In some examples, individuals who have different financial institutions may possess contactless cards 101 to provide information to initiate one or more payment requests from the card-tapping individual.

In some examples, the present disclosure refers to a tap of the contactless card. However, it is understood that the present disclosure is not limited to a tap, and that the present disclosure includes other gestures (e.g., a wave or other movement of the card).

Figure 9:
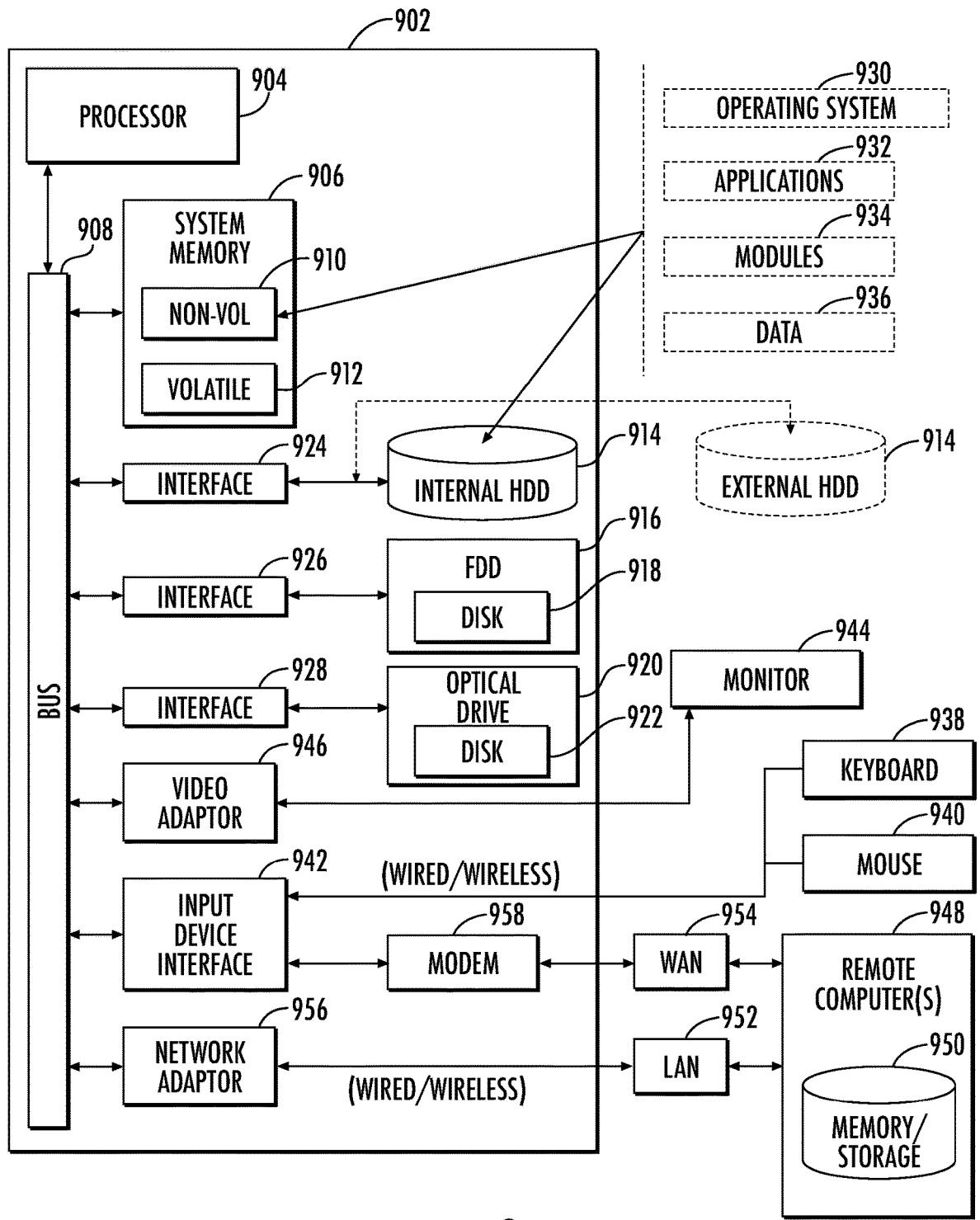
FIG. 9 illustrates an embodiment of a computing architecture.

FIG. 9 illustrates an embodiment of an exemplary computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the system 100. In some embodiments, computing system 902 may be representative, for example, of the mobile devices 110 of the system 100. The embodiments are not limited in this context. More generally, the computing architecture 900 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 9, the computing system 902 comprises a processor 904, a system memory 906 and a system bus 908. The processor 904 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-8.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100, e.g., the operating system 112, account application 113, other applications 114, tapping engine 115.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 952 and the WAN 954.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A computer-implemented method, comprising:
receiving, by a processor of a device from a contactless card, action data comprising a uniform resource locator (URL);
determining, by the processor based on the URL of the action data, an application associated with the URL, wherein the URL is directed to the application, wherein the application provides a function to activate the contactless card;
determining, by the processor based on a parameter of the URL, a card activation page of the application that provides the function to activate the contactless card; and
opening, by the processor, the card activation page of the application based on the determination that the application is associated with the URL and the determination of the card activation page of the application that provides the function to activate the contactless card.

2. The computer-implemented method of claim 1, further comprising:
initiating, by the card activation page of the application, activation of the contactless card to transition the contactless card from an inactive state to an active state.

3. The computer-implemented method of claim 2, further comprising:
outputting, by the processor, a notification specifying the contactless card has been activated.

4. The computer-implemented method of claim 1, further comprising:
determining, by the processor, that the action data is associated with activating the contactless card based on an activation indication specified in the action data.

5. The computer-implemented method of claim 1, further comprising:
determining, by the processor prior to opening the card activation page of the application, that a component of a mobile operating system (OS) is in a foreground of the OS, wherein the card activation page of the application is opened further based on the determination that the component of the mobile OS is in the foreground of the OS.

6. The computer-implemented method of claim 1, wherein the action data is formatted according to an International Organization for Standardization (ISO)/International Electrotechnical Commission (IEC) 14443 format.

7. The computer-implemented method of claim 1, wherein the action data is received via near-field communications (NFC), wherein the action data is in an NFC Data Exchange Format (NDEF).

8. The computer-implemented method of claim 7, wherein a cryptogram is received via NFC and is in the NDEF, the method further comprising:
determining, by the application, that the cryptogram was verified by the application or a server.

9. A non-transitory computer-readable storage medium, the computer-readable storage medium including instructions that when executed by a processor, cause the processor to:
receive, from a contactless card, action data comprising a uniform resource locator (URL);
determine, based on the URL of the action data, an application associated with the URL, wherein the URL is directed to the application, wherein the application provides a function to activate the contactless card;
determine, based on a parameter of the URL, a card activation page of the application that provides the function to activate the contactless card; and
open the card activation page of the application based on the determination that the application is associated with the URL and the determination of the card activation page of the application that provides the function to activate the contactless card.

10. The computer-readable storage medium of claim 9, wherein the instructions further cause the processor to:
initiate, by the card activation page of the application, activation of the contactless card to transition the contactless card from an inactive state to an active state.

11. The computer-readable storage medium of claim 10, wherein the instructions further cause the processor to:
output a notification specifying the contactless card has been activated.

12. The computer-readable storage medium of claim 9, wherein the instructions further cause the processor to:
determine that the action data is associated with activating the contactless card based on an activation indication specified in the action data.

13. The computer-readable storage medium of claim 9, wherein the instructions further cause the processor to:
determine, prior to opening the card activation page of the application, that a component of a mobile operating system (OS) is in a foreground of the OS, wherein the card activation page of the application is opened further based on the determination that the component of the mobile OS is in the foreground of the OS.

14. The computer-readable storage medium of claim 9, wherein the action data is received via near-field communications (NFC), wherein the action data is in an NFC Data Exchange Format (NDEF).

15. The computer-readable storage medium of claim 9, wherein the action data is formatted according to an International Organization for Standardization (ISO)/International Electrotechnical Commission (IEC) 14443 format.

16. A computing apparatus comprising:
 a processor; and
 a memory storing instructions that, when executed by the processor, cause the processor to:
  receive, from a contactless card, action data comprising a uniform resource locator (URL);
  determine, based on the URL of the action data, an application associated with the URL, wherein the URL is directed to the application, wherein the application provides a function to activate the contactless card;
  determine, based on a parameter of the URL, a card activation page of the application that provides the function to activate the contactless card; and
  open the card activation page of the application based on the determination that the application is associated with the URL and the determination of the card activation page of the application that provides the function to activate the contactless card.

17. The computing apparatus of claim 16, wherein the instructions further cause the processor to:
 initiate, by the card activation page of the application, activation of the contactless card to transition the contactless card from an inactive state to an active state.

18. The computing apparatus of claim 16, wherein the instructions further cause the processor to determine the action data is associated with activating the contactless card based on an activation indication specified in the action data.

19. The computing apparatus of claim 16, wherein the action data is formatted according to an International Organization for Standardization (ISO)/International Electrotechnical Commission (IEC) 14443 format.

20. The computing apparatus of claim 16, wherein the action data is received via near-field communications (NFC), wherein the action data is in an NFC Data Exchange Format (NDEF).

* * * * *